(12) United States Patent
Brown et al.

(10) Patent No.: US 7,809,353 B2
(45) Date of Patent: Oct. 5, 2010

(54) AUTOMATIC SECURITY ACTION INVOCATION FOR MOBILE COMMUNICATIONS DEVICE

(75) Inventors: Michael S. Brown, Kitchener (CA); Neil Adams, Waterloo (CA); Steven Fyke, Waterloo (CA); Herbert Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 662 days.

(21) Appl. No.: 11/750,594

(22) Filed: May 18, 2007

(65) Prior Publication Data

US 2007/0298767 A1 Dec. 27, 2007

Related U.S. Application Data

(60) Provisional application No. 60/747,588, filed on May 18, 2006.

(51) Int. Cl.
*H04M 1/66* (2006.01)
(52) U.S. Cl. ............... 455/410; 455/411; 455/466; 455/575
(58) Field of Classification Search ............... 379/37, 379/41, 45, 51; 455/404, 410, 411, 414, 455/456, 521, 551, 558, 565, 566, 571, 572, 455/573, 574, 575.1
See application file for complete search history.

(56) References Cited

U.S. PATENT DOCUMENTS

| | | | |
|---|---|---|---|
| 5,131,040 A * | 7/1992 | Knapczyk | 380/277 |
| 6,370,402 B1 * | 4/2002 | Hakomori | 455/550.1 |
| 6,940,407 B2 | 9/2005 | Miranda-Knapp et al. | |
| 2004/0123153 A1 | 6/2004 | Wright et al. | |
| 2005/0020315 A1 | 1/2005 | Robertson | |
| 2005/0021468 A1 | 1/2005 | Stockton | |
| 2005/0046580 A1 * | 3/2005 | Miranda-Knapp et al. | 340/686.1 |

(Continued)

FOREIGN PATENT DOCUMENTS

| | | |
|---|---|---|
| EP | 1501330 A | 1/2005 |
| EP | 1569477 A1 | 8/2005 |
| GB | 2326062 A | 12/1998 |

OTHER PUBLICATIONS

International Search Report (PCT Article 18 and Rules 43 and 44) for PCT/CA2007/000899; Aug. 20, 2007; 6 pages.

(Continued)

*Primary Examiner*—Danh C. Le
*Assistant Examiner*—Dinh P Nguyen
(74) *Attorney, Agent, or Firm*—Ridout & Maybee LLP

(57) ABSTRACT

A mobile communications device, method and computer program product for providing security are described. In one embodiment, the device comprises: a processor; a communications subsystem; a storage element having application modules and data; and a security module operable to detect a locked state of the device and initiate a lockout data protection timer for a predetermined duration upon detection of the locked state. The security module is operable to, after the lockout data protection timer has been initiated, detect if a password is entered through a user input device within the predetermined duration and to terminate the lockout data protection timer if entry of the password is detected to perform a security action comprising erasing or encrypting at least some of the data if entry of the password is not detected.

41 Claims, 7 Drawing Sheets

U.S. PATENT DOCUMENTS

2005/0070339 A1    3/2005  Kim
2005/0114389 A1*   5/2005  Kamiya .................... 707/102
2005/0136979 A1*   6/2005  Dietl et al. ................ 455/558
2007/0100978 A1*   5/2007  Levi et al. ................. 709/223

OTHER PUBLICATIONS

Written Opinion of the International Searching Authority for PCT/CA2007/000899; Aug. 20, 2007; 13 pages.

* cited by examiner

US 7,809,353 B2

AUTOMATIC SECURITY ACTION INVOCATION FOR MOBILE COMMUNICATIONS DEVICE

RELATED APPLICATION DATA

The present application claims priority to provisional U.S. patent application No. 60/747,588, filed May 18, 2006, which is incorporated herein by reference. The present application is also related to commonly-owned U.S. application Ser. Nos. both entitled "AUTOMATIC SECURITY ACTION INVOCATION FOR MOBILE COMMUNICATIONS DEVICE" filed under Ser. No. 11/750,789 and Ser. No. 11/750,568 on even date herewith, which are incorporated by reference.

TECHNICAL FIELD

The present application relates to security for mobile communications devices.

BACKGROUND

As a result of their mobility, mobile communications devices are sometimes lost or stolen. Frequently, the loss of the information stored on a missing device is of greater concern than the loss of the device itself. For example, the device may have sensitive and/or confidential information stored on it that could cause harm if acquired by others. Such sensitive information could include, among other things, stored messages of a confidential nature, and stored communications information that would allow a third party to masquerade electronically as the person to whom the mobile device rightfully belongs.

In some mobile communications networks, once a user discovers that his or her mobile device is missing, he or she can contact the network operator or the system administrator for his or her organization and request that a "kill packet" be sent to the missing mobile device instructing the device to wipe sensitive information from its memory. However, such a system requires that the user realize that the mobile device is missing, and that the mobile device be in communication with the network. If the user relies on the device for communication, they may be unable to report it missing or stolen in a timely manner.

Thus, security for mobile communications devices remains a concern.

BRIEF DESCRIPTION OF THE DRAWINGS

It will be noted that throughout the drawings similar features are identified by the same reference numerals.

DETAILED DESCRIPTION

Figure 1:
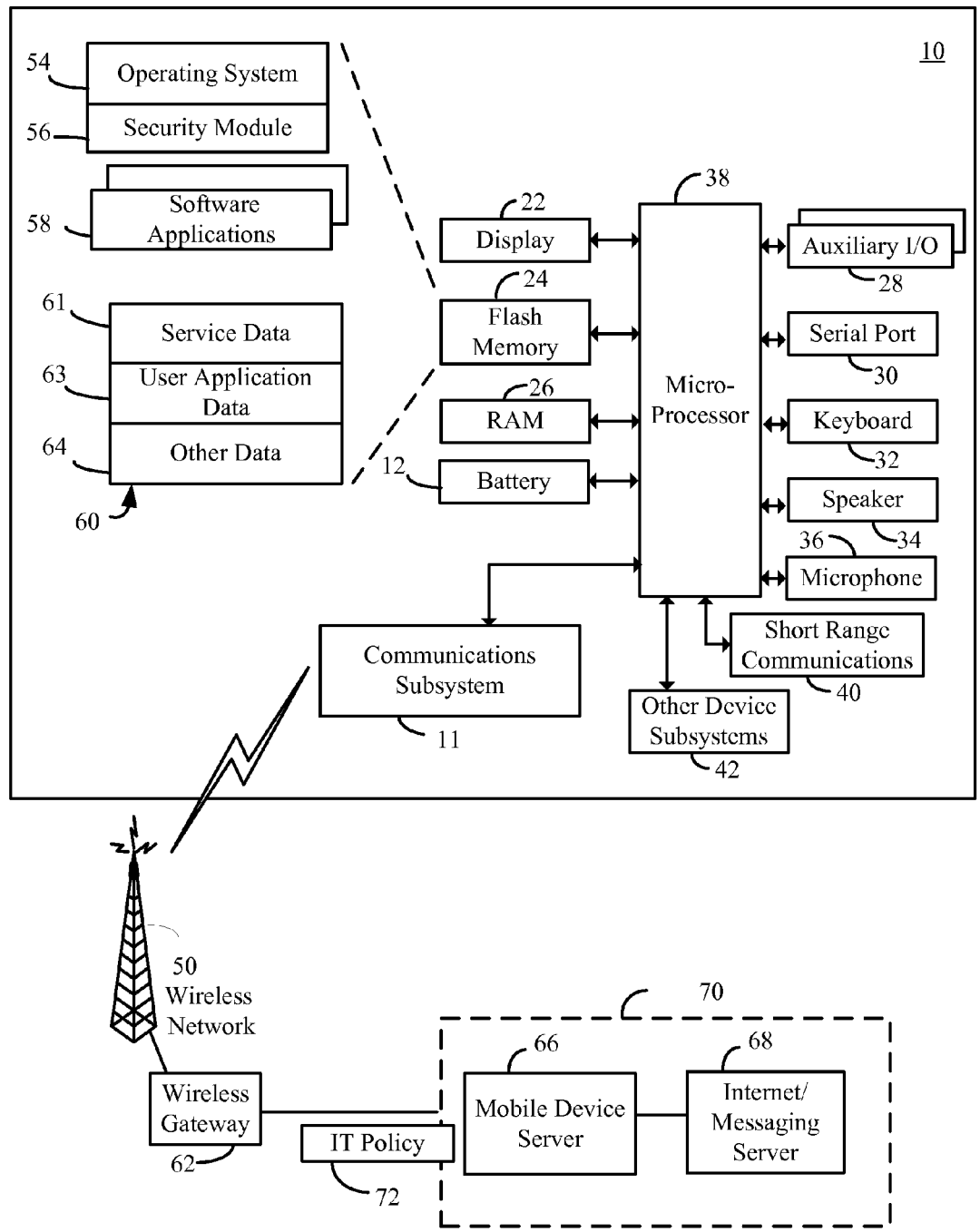
FIG. 1 is a block diagram showing a communications system including a mobile communications device to which embodiments described herein may be applied.

In accordance with one example embodiment of the present application, there is provided a mobile communications device, comprising: a processor; a communications subsystem connected to the processor operable to exchange signals with a wireless network and with the processor; a storage element connected to the processor and having a plurality of application modules and data stored thereon, the data comprising at least user application data associated with the application modules and service data including data for establishing communications with the wireless network; and a security module operable to detect a locked state of the mobile communications device and initiate a lockout data protection timer for a predetermined duration upon detection of the locked state; and wherein the security module is operable to, after the lockout data protection timer has been initiated, detect if a password shared by the user and the mobile communications device is entered through a user input device within the predetermined duration of the lockout data protection timer; wherein the security module is operable to terminate the lockout data protection timer if entry of the password is detected within the predetermined duration; and wherein the security module is operable to perform a security action comprising erasing or encrypting at least some of the data on the storage element if entry of the password is not detected within the predetermined duration.

In accordance with another example embodiment of the present application, there is provided a method for providing security on a mobile communications device, the mobile communications device being configured to communicate with a wireless communications network and including a storage element having data stored thereon, the method comprising the acts of: monitoring to detect for the locked state of the mobile communications device and initiating a lockout data protection timer for a predetermined duration upon detection of the locked state; and monitoring, after the lockout data protection timer has been initiated, to detect if a password shared by the user and the mobile communications device is entered through the user input device within the predetermined duration of the lockout data protection timer; if entry of the password is detected within the predetermined duration, terminating the lockout data protection timer; and if entry of the password is not detected within the predetermined duration, performing a security action comprising erasing or encrypting at least some of the data on the storage element.

In accordance with a further example embodiment of the present application, there is provided a computer program product comprising a machine-readable medium tangibly embodying instructions executable on a mobile communications device for providing security on the mobile communications device, the machine-readable instructions comprising: code for monitoring to detect for the locked state of the mobile communications device and initiating a lockout data protection timer for a predetermined duration upon detection of the locked state; code for monitoring, after the lockout data protection timer has been initiated, to detect if a password shared by the user and the mobile communications device is entered through the user input device within the predetermined duration of the lockout data protection timer; code for terminating the lockout data protection timer if entry of the password is detected within the predetermined duration; and code for performing a security action comprising erasing or encrypting at least some of the data on the storage element if entry of the password is not detected within the predetermined duration.

Referring now to the drawings, FIG. 1 is a block diagram of a mobile communication device 10 to which example embodiments described herein can be applied. The mobile communication device 10 is a two-way communication device having at least data and possibly also voice communication capabilities and the capability to communicate with other computer systems on the Internet. Depending on the functionality provided by the device, in various embodiments the device may be a data communication device, a multiple-mode communication device configured for both data and voice communication, a mobile telephone, a PDA (personal digital assistant) enabled for wireless communication, or a computer system with a wireless modem, among other things.

The mobile device 10 includes a wireless communication subsystem 11 for exchanging radio frequency signals with a wireless network 50. The communication subsystem 11 includes a receiver, a transmitter, and associated components, such as one or more antenna elements, local oscillators (LOs), and digital signal processor (DSP). As will be apparent to those skilled in the field of communications, the particular design of the communication subsystem 11 depends on the wireless network 50 in which mobile device 10 is intended to operate.

The mobile device 10 may send and receive communication signals over the wireless network 50 after the required network registration or activation procedures have been completed. Signals received by the antenna through the wireless network 50 are input to the receiver, which may perform such common receiver functions as signal amplification, frequency down conversion, filtering, channel selection, and the like, and analog-to-digital (A/D) conversion. A/D conversion of a received signal allows more complex communication functions such as demodulation and decoding to be performed in the DSP. In a similar manner, signals to be transmitted are processed, including modulation and encoding, for example, by DSP. These DSP-processed signals are input to the transmitter for digital-to-analog (D/A) conversion, frequency up conversion, filtering, amplification and transmission over the wireless network 50 via the antenna. The DSP not only processes communication signals, but also provides for receiver and transmitter control. For example, the gains applied to communication signals in the receiver and the transmitter may be adaptively controlled through automatic gain control algorithms implemented in the DSP.

The mobile device 10 includes a controller in the form of at least one microprocessor 38 that controls the overall operation of the mobile device 10. The microprocessor 38 interacts with communications subsystem 11 and also interacts with further device subsystems such as the display 22, flash memory 24, random access memory (RAM) 26, auxiliary input/output (I/O) subsystems 28, serial port 30, keyboard or keypad 32, speaker 34, microphone 36, a short-range communications subsystem 40, a clickable thumbwheel (trackwheel) or trackball (not shown), and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, enables execution of software applications 58 on the device. A predetermined set of applications 58 which control basic device operations, including at least data and voice communication applications for example, will normally be installed on the mobile device 10 during manufacture. Further applications may also be loaded onto the mobile device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the mobile device 10.

In a data communication mode, a received signal such as a text message or web page download will be processed by the communication subsystem 11 and input to the microprocessor 38, which will further process the received signal for output to the display 22, or alternatively to an auxiliary I/O device 28. A user of mobile device 10 may also compose data items such as email messages for example, using the keyboard 32 in conjunction with the display 22 and possibly an auxiliary I/O device 28. Such composed items may then be transmitted over a communication network through the communication subsystem 11.

The serial port 30 (which may for example be a Universal Serial Bus (USB) port) in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the mobile device 10 other than through a wireless communication network.

A short-range communications subsystem 40 is a further component which may provide for communication between the mobile device 10 and different systems or devices, which need not necessarily be similar devices. For example, the subsystem 40 may include an infrared device and associated circuits and components or a Bluetooth™ communication module to provide for communication with similarly enabled systems and devices. The mobile device 10 may be a handheld device. The mobile device 10 includes a battery 12 as a power source, which will typically be a rechargeable battery that may be charged, for example, through charging circuitry coupled to the USB port 30

Wireless communication network 50 is, in an example embodiment, a wireless wide area packet data network, which provides radio coverage to mobile devices 10. Wireless communication network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, network 50 is a wireless local area network (WLAN), such as for example a network compliant with one or more of the IEEE 802.11 family of standards. In some example embodiments, the mobile device 10 is configured to communicate in both data and voice modes over both wireless WAN and WLAN networks and to roam between such networks.

In an example embodiment, wireless gateway 62 is adapted to route data packets received from a mobile communication device 10 over wireless mobile network 50 to destination electronic mail messaging or Internet access server 68 through a mobile device server 66, and to route data packets received from the server 68 through the mobile device server 66 over the wireless mobile network 50 to a destination mobile communications device. Wireless gateway 62 forms a connection or bridge between the servers and wireless networks associated with wireless e-mail communication and/or Internet access. In an example embodiment, wireless gateway 62 is coupled between wireless network 50 and a hardwired data network (for example an enterprise network 70 that is located behind a firewall) that includes mobile device server 66 and electronic mail server 68. The wireless gateway 62, in example embodiments, stores system configuration information, system state data, and tables that store mobile device 10 information. The mobile device server 66, in example embodiments, is a server located in an enterprise network 70 behind a firewall and connected to the wireless gateway 62 through the Internet or another connection. Mobile device server 66 is configured as an enterprise's interface between the enterprise network 70 and the wireless network 50. Typically, a plurality of mobile devices 10 will be associated with a mobile device server 66 that is part of the enterprise network 70 managed by an organization that the users of such mobile devices 10 are part of. Mail server 68 is coupled to mobile device server 66 and, in one embodiment, is a conventional electronic mail server. In another embodiment, the mobile device server 66 is a component of the mail server 68. In some embodiments, the mobile device server 66 may be operated by a wireless carrier that operates wireless network 50.

The mobile device 10 stores data 60 in an erasable persistent memory, which in one example embodiment is flash memory 24. In various embodiments, the data 60 includes service data 61 comprising information required by the mobile device 10 to establish and maintain communications with the wireless communications network 50 (wireless network service data) and the wireless gateway 62 (gateway service data). The data 60 may also include other data 64, user application data 63 such as email messages, address book and contact information, calendar and schedule information, notepad documents, image files, and other commonly stored user information stored on the mobile device 10 by its user. The data 60 may also include data required for the communications layers managed by the mobile device server 66 and servers 68. The data 60 often includes critical data that the user of mobile device 10 (or others) does not want to be accessed by an unauthorized party.

In some examples, flash memory 24 may include both a memory component that is permanently part of the mobile device 10, as well a removable memory including for example memory on a Subscriber Identity Module (SIM) card. Some of the data 60 may be stored on the SIM card, and some stored on permanent flash memory.

In an example embodiment, mobile device server 66 is configured to periodically transmit IT (Information Technology) data protection policy messages 72 (sometimes referred to as merely policy messages 72) through the wireless gateway 62 and wireless network 50 to its associated mobile devices 10. Typically, mobiles devices 10 will have a number of settings, including security settings that are governed by a data protection policy. The periodic transmission of data protection policy messages from the mobile device server 66 to addressed mobile device 10 that are associated with the mobile device server 66 assists in ensuring, among other things, that each of the mobile devices 10 is kept up to date with the latest data protection policy. The content and frequency of policy messages 72 can be set by an authorized IT administrator of enterprise network 70.

Figure 2:
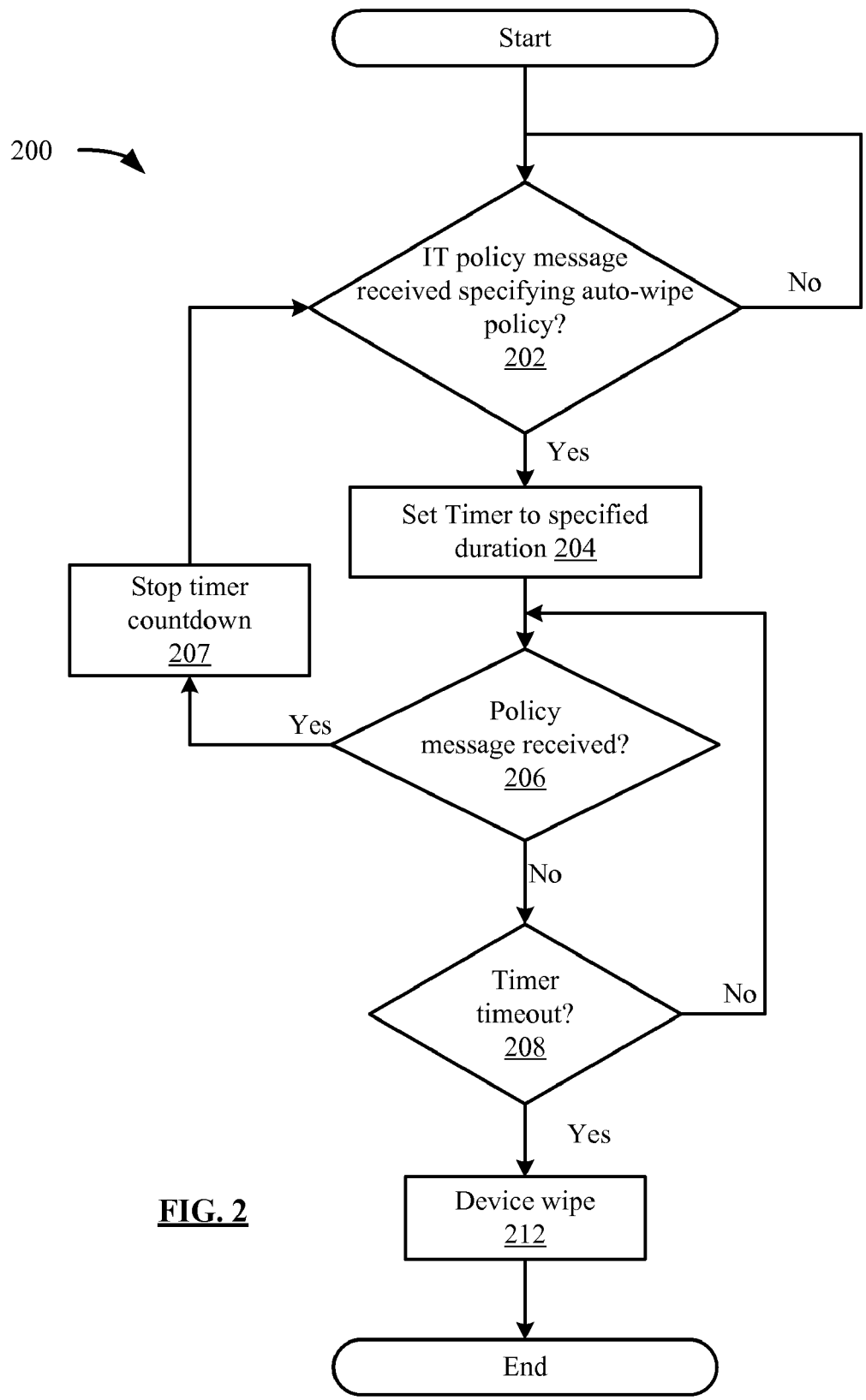
FIG. 2 is a flow diagram of a security process according to a first example embodiment.

In order to provide security for a lost or stolen mobile device 10, the mobile device 10 includes a security module 56, which in one example embodiment is implemented by a software component that is part of the operating system 54. In other embodiments, the security module 56 is, or is part of, a specialized software application 58 separate from the operating system 54. The security module 56 includes instructions for configuring the microprocessor 38 to cause the mobile device 10 to carry out at least parts of the security processes that are described below. The process 200 shown in FIG. 2 is intended to address a security situation in which a user's mobile device 10 has been lost or stolen and is no longer able to receive messages from the mobile device server 66 and hence cannot receive a "Kill Packet" or "Device Wipe" command. Generally, in the security process 200, a data protection security action (for example, a device wipe) is taken on the mobile device 10 if a specified amount of time passes without the mobile device 10 receiving a policy message 72 from its associated mobile device server 66. Thus, if the mobile device 10 is out of radio coverage for too long a time period, it will be wiped. Also, even if the device is in radio coverage of a wireless network, but that particular network is not a network through which the mobile device 10 can receive data protection policy packets from the mobile device server 66, then the mobile device 10 will be wiped—for example, if the mobile device 10 moves out of coverage its "home" wireless network 50 into an area of alternative network coverage where the operator of the "home" wireless network 50 does have appropriate coverage agreements in place, then the mobile device 10 will be wiped after a predetermined duration. Additionally, as will be explained in greater detail below, in some embodiments, the mobile device 10 will be wiped if it is turned off for too long and thus does not receive an updated policy message 72 due to being in the "off" state. Alternatively, in other embodiments rather than wiping the device (i.e., erasing data from the mobile device 10) data 60 on the mobile device 10 may be encrypted.

Prior to explaining the operation of a particular mobile device 10 in greater detail in the context of FIG. 2, the configuration of the mobile device server 66 will first be discussed. In an example embodiment, an IT manager or administrator makes a decision to enable auto-wipe security for at least some of the mobile devices 10 that are associated with the mobile device server 66, and uses an IT data protection policy editor that is coupled to the mobile device server 66 to set a data protection policy for the affected mobile devices 10 to automatically wipe the mobile device 10 when the data protection policy is out of date. As part of selecting the auto-wipe policy, the IT administrator can set both the frequency at which policy messages 72 are sent, and the duration of time that an auto-wipe should occur after if an updated policy message 72 is not received at a mobile device 10 (i.e., the duration of a timer(s), as described in more detail below). In some embodiments, these values may be set at the same time or at different times (for example, via separate user interface dialogues or menus). This allows the frequency at which policy messages 72 are sent and the duration of timers to be configured independently. In some embodiments, the duration of the timer may be configured to be same as the frequency at which policy messages 72 are sent, or may be configured to be different. Setting the frequency of policy messages 72 to be the same as the duration of the timer (for example, setting the policy messages 72 to be sent every 5 minutes and setting the timer duration to 5 minutes) provides a configuration in which the mobile device 10 cannot miss a single policy message 72 without performing a data protection security action (e.g., a device wipe). This configuration may not be advantageous for users that may be out of coverage periodically, depending on the specific timer duration/frequency of policy messages 72. For such users, specifying a timer duration which is greater than the frequency of policy messages 72 may allow one or more policy messages 72 to be missed without performing a data protection security action (depending on the specific values assigned to the frequency of the policy messages 72 and the timer duration), if this capability is desired. By way of illustrative example only, the auto-wipe countdown timer starting time duration could be 24 hours, with the standard duration between policy messages 72 being set at 8 hours, with the result that missing 3 consecutive policy messages 72 will result in a device wipe.

In some embodiments, the IT administrator has the option of setting the data protection policy globally for all mobile devices 10 associated with the mobile device server 66, or for groups or classes of mobile devices 10 associated with the mobile device server 66, or for one or more individual mobile devices 10 associated with the mobile device server 66.

Figure 8:
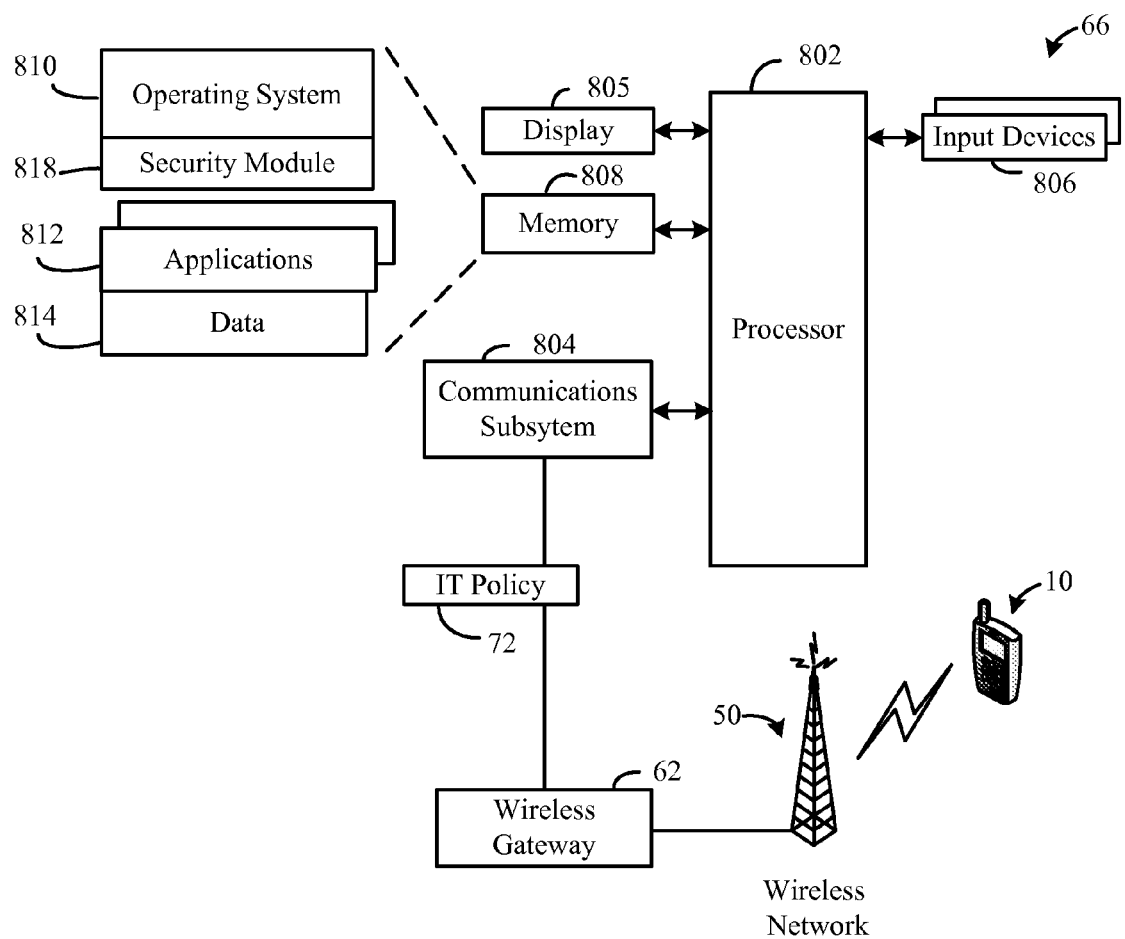
FIG. 8 is a block diagram showing a mobile device server to which embodiments described herein may be applied.

Referring now to FIG. 8, an example embodiment of the mobile device server 66 will be briefly described. The mobile device server 66 may be a computer implementing a server application(s) configured for performing the security processes and functions described herein. The mobile device server 66 in this example embodiment comprises a processor 802 (i.e., microprocessor) for controlling its operation, a communications subsystem 804 connected to the processor 802 for communicating with the wireless network 50 via the wireless gateway 62 and with the processor 802, a display 805 such as a monitor, one or more user input devices 806 such as a keyboard and mouse connected to the processor 802 for sending user input signals to the processor 802 in response to user inputs, and a memory or storage element 808 such as a hard disk drive (HDD), RAM, ROM and/or other suitable memory connected to the processor 802, and other suitable input and output devices (not shown) as desired or required. Operating system software 810, software applications 812, and data 814 used by the processor 802 are stored in the memory 808. The applications 812 and data 814 configure the operation of the mobile device server 66. Other features of the mobile device server 66 for implementing the security processes and functions described herein will be appreciated by persons ordinarily skilled in the art.

The mobile device server 66 also includes a security module 818 which, in this example embodiment, is implemented by one or more software components or modules stored in memory 808. The security module 818 configures the processor 802 to carry out at least parts of the security processes of the mobile device server 66 that are described herein. In one example embodiment, the security module 818 is configured for sending policy messages 72 to one or more of the mobile devices 10 in the plurality of mobile communications devices 10 associated with the mobile device server 66 at predetermined intervals in accordance with a predetermined frequency, the policy messages including instructions for execution by the one or more of the mobile devices 10 to enforce (i.e., initiate, modify, maintain) or terminate a data protection policy, as explained in more detail herein.

Once the data protection policy associated with one or more mobile devices 10 is set to specify an auto-wipe policy, a corresponding policy message 72 specifying the auto-wipe policy is pushed through wireless gateway 62 and wireless network 50 to the affected mobile devices 10. In some embodiments, the policy message 72 containing an auto-wipe policy is sent immediately upon the policy being changed. In other embodiments, the revised data protection policy is sent at the next regularly scheduled interval via a policy message 72. In an example embodiment, so long as the auto-wipe policy is in effect, each of the policy messages 72 that are sent to the affected mobile device 10 will include confirmation that the auto-wipe policy is in effect. In the event that the administrator chooses to rescind the auto-wipe policy, the next policy message 72 that is sent out from the mobile device server 66 will omit the auto-wipe policy confirmation.

Turning again to FIG. 2, as indicated in step 202, the mobile device 10 is configured to detect if and when a policy message 72 that specifies an auto-wipe policy is received by the mobile device 10. Next in step 204, if a policy message 72 specifying an auto-wipe policy is received, the mobile device 10 sets an internal auto-wipe timer to a predetermined time duration, and starts counting down from the predetermined time duration. In an example embodiment, the predetermined time duration to be used for the auto-wipe countdown timer is set in the received policy message 72 (and thus set by the IT administrator through mobile device server 66, as indicated above). In other example embodiments, the countdown auto-wipe timer duration can be set directly at the mobile device 10 by a user thereof (although caution may need to be exercised as user's often won't have an in depth knowledge of how often policy messages 72 are actually sent). In an example embodiment, the countdown auto-wipe timer tracks absolute time relative to when the policy message 72 is received such that any attempt by a user of the device to alter the time by re-setting the clock time and date on the device (either in a conscious attempt to thwart the pending device wipe, or in an innocent attempt to adjust to a different time zone) does not affect the total duration of time allocated to the auto-wipe countdown timer.

As indicated in steps 206 and 208, once the auto-wipe timer has been set and begins to countdown, the mobile device 10 monitors for the earliest of the following two events to occur: (a) for a new policy message 72 to be received (step 206); or (b) for the auto-wipe timer to time out (step 208). In the event that the auto-wipe countdown timer times out before a new data protection policy message 72 is received by the mobile device 10, then a device wipe is automatically performed (step 212) (described in greater detail below). In the event that a new data protection policy message 72 is received before time out of the auto-wipe timer, then the timer countdown ends (step 207), and a check is done to see if the newly received policy message 72 also specifies an auto-wipe policy (step 202). If so, the auto-wipe timer is reset to the time specified in the newly received policy message 72, and the countdown process begins again.

Turing again to step 212 of FIG. 2, a device wipe includes permanently erasing of all user data 60 stored on the permanent storage (for example flash memory 24) and transient storage (for example RAM 26) of the mobile device 10. In at least some embodiments, erasing the data includes ensuring that at least the relevant memory locations are overwritten with meaningless bits (for example all zeros or all ones). Thus, in a device wipe, in various embodiments, information required by the mobile device 10 to function as a communications device is deleted (thereby disabling the mobile device 10 as a communications device—as a possible exception, the ability of the mobile device 10 to be used for emergency calls such as 911 calls may be maintained), and any information such as stored email and other messages, address book lists, task items, etc. that may be confidential to the user is deleted. In some example embodiments, a device wipe can include erasing only selected classes of data 60 (for example erasing of all service data 61, but not user application data 63, or alternatively, erasing all user application data 63 but not service data 61).

Figure 3:
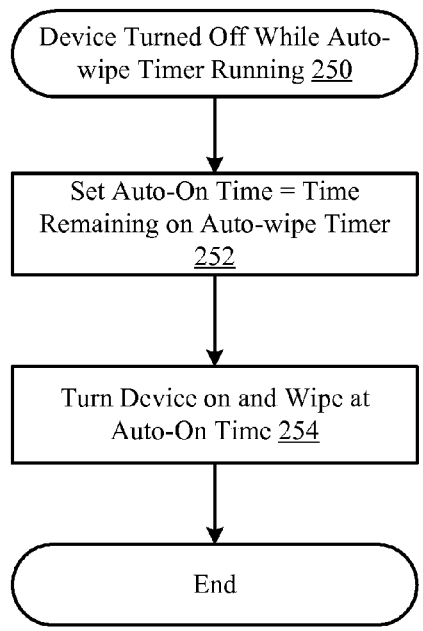
FIG. 3 is a flow diagram showing a security sub-process that can work in conjunction with the security process of FIG. 2.

With reference to FIG. 3, in at least one example embodiment, the security module 56 is also configured to wipe the mobile device 10 when it is turned off and missing data protection policy messages 72. Typically, when the mobile device is in an off state its draw on battery 12 is greatly reduced and substantially all of the device's functions are suspended (for example, its display 22 and wireless communications subsystem 11 are shut down). Some limited device functions continue even when the mobile device 10 is powered off, for example, in an off device, an internal clock continues to run and the device monitors for activation of an "ON" button (so long as the battery has sufficient power). When the mobile device 10 is powered off, it does not have the ability to receive messages (including policy messages 72) through the wireless communications subsystem 11. In one example embodiment, the mobile device 10 is configured so that turning the device off will not thwart an impending device wipe. As indicated in process 245 of FIG. 3, the security module 56 detects if shutdown of the mobile device is initiated (for example, through user selection of a "Turn Power Off" option) while the auto-wipe countdown timer from process 200 is running (step 250). If the device power off is initiated while the auto-wipe timer is running, then an auto-on time is set corresponding to the time remaining on the auto-wipe countdown timer (step 252). If the device is still turned off when the auto-on time is reached, the device automatically powers on and performs the device wipe (step 254). In example embodiments, sub-process 245 can be enabled and disabled through policy messages 72.

Thus it will be appreciated that the security process of FIG. 2 is based on an underlying assumption that if a mobile device 10 cannot receive a policy message 72, it cannot receive a kill packet, and accordingly data on the device is potentially at risk. This risk is mitigated by wiping the data automatically after a specified amount of time passes without the mobile device receiving a policy message 72. In at least some example embodiments, as indicated in FIG. 3, the mobile device 10 will execute the device wipe even if it is turned off prior to the expiry of the specified time duration.

Figure 4:
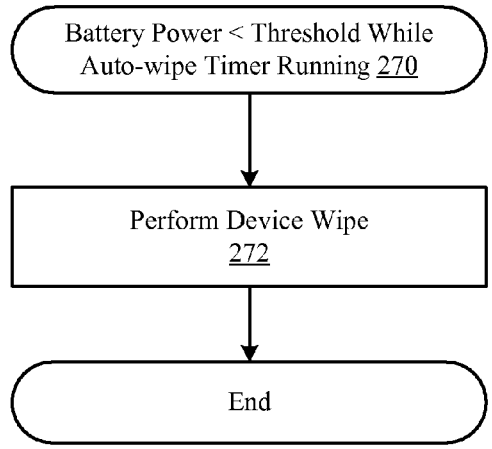
FIG. 4 is a flow diagram showing a yet further security sub-process that can work in conjunction with the security process of FIG. 2.

The security process of FIG. 2 (either on its own or as combined with the process of FIG. 3) can be varied in example embodiments to reduce the possibility that a device wipe that should otherwise have occurred will not occur due to the mobile device 10 turning off due to a discharged battery 12. In this regard, with reference to FIG. 4, a sub-process 265 can be performed as part of process 200 wherein while the auto-wipe countdown timer of process 200 is running, the security module 200 monitors to determine if the battery power 12 falls below a particular threshold (step 270), and if the battery power does fall below the predetermined threshold, then a device wipe is performed immediately (step 272).

In at least one example embodiment, the critical low battery threshold is the level at which the mobile device will automatically turn off its RF radio (namely when the mobile device 10 will turn off the transmitter and receiver circuitry of the wireless communications system 11)—the turning off of the radio is a relevant event as the mobile device 10 can no longer receive a kill packet when its radio is off. In an alternate embodiment, the critical low battery threshold is a predetermined (or dynamically determined) level at which the mobile device 10 has just enough battery power remaining to execute the wipe process. Thus, the sub-process 265 in combination with process 200 provides a security environment in which a mobile device that is configured to automatically perform a device wipe if a new policy message is not received within a predetermined time duration will perform a preemptive device wipe prior to waiting for the entirety of the predetermined time duration if in the meantime battery power goes too low. Such a configuration recognizes that attempting to wait the entire duration of the countdown auto-wipe timer will be ineffective if the battery will not contain enough power to facilitate the wipe at the future time. In example embodiments, sub-process 265 can be enabled and disabled through policy messages 72.

In some embodiments, the sub-process 265 may be implemented independently of the process 200. In such embodiments, a separate IT data protection policy rule may be implemented indicating that the device should wipe itself when the battery level falls below a predetermined threshold regardless of whether an auto-wipe countdown timer is running.

Another example of a security process that can be applied to mobile device 10 according to a further embodiment will now be described with reference to FIG. 5. The security process 500 of FIG. 5 permits a user's device to be wiped when it has been lost or stolen but has not been reported as such. In such a situation, the IT administrator will not know that a kill packet should be sent, and furthermore, the device may still be receiving policy messages 72 and accordingly a device wipe through the process 200 will not necessarily be triggered. In an example embodiment, the security module 56 of mobile device 10 is configured to place the mobile device 10 into standby locked state upon the occurrence of certain events. While the mobile device 10 is in a locked mode, the device user is prevented from using substantially all of the functionality of the device, including accessing any data stored on the mobile device 10. In order to get the mobile device out of its locked state, the user must enter a password or other shared secret (for example through a keyboard of the device). The events that trigger placing the mobile device 10 into a locked state may include, for example, user selection of a device lock option; user inactivity for a predetermined duration; lack of wireless network coverage or activity for a predetermined duration or holstering or closing of the mobile device 10.

It will be appreciated that the trigger condition for initiating a locked state of the mobile device 10 may be one of: user input instructing the mobile communications device 10 to initiate the locked state; the occurrence of a periodic interval or the expiry of a predetermined duration (for example, a long-term timeout may be implemented by the IT administrator which causes the mobile communications device 10 to lock periodically after a predetermined duration from a trigger condition (such as the unlocking of the device from a previous locked state) regardless of the user activity or network coverage at the time); user inactivity for a predetermined duration (for example, as measured by a lack of user input via the user input devices 28, 32); loss of communication with the wireless network 50; and holstering of the mobile communications device 10 if the device is a holsterable device or closing of the mobile communications device 10 if the device is a flip-style device.

The trigger condition may also include a variance from a predetermined threshold in a communications characteristic (such as a messaging traffic pattern between the mobile communications device 10 and the wireless network 50) between the mobile communications device 10 and the wireless network 50, a lack of communication by the mobile communications device 10 with the wireless network 50 for a predetermined duration of time, and a variance in the use of the input devices 28, 32 from a predetermined threshold.

Figure 5:
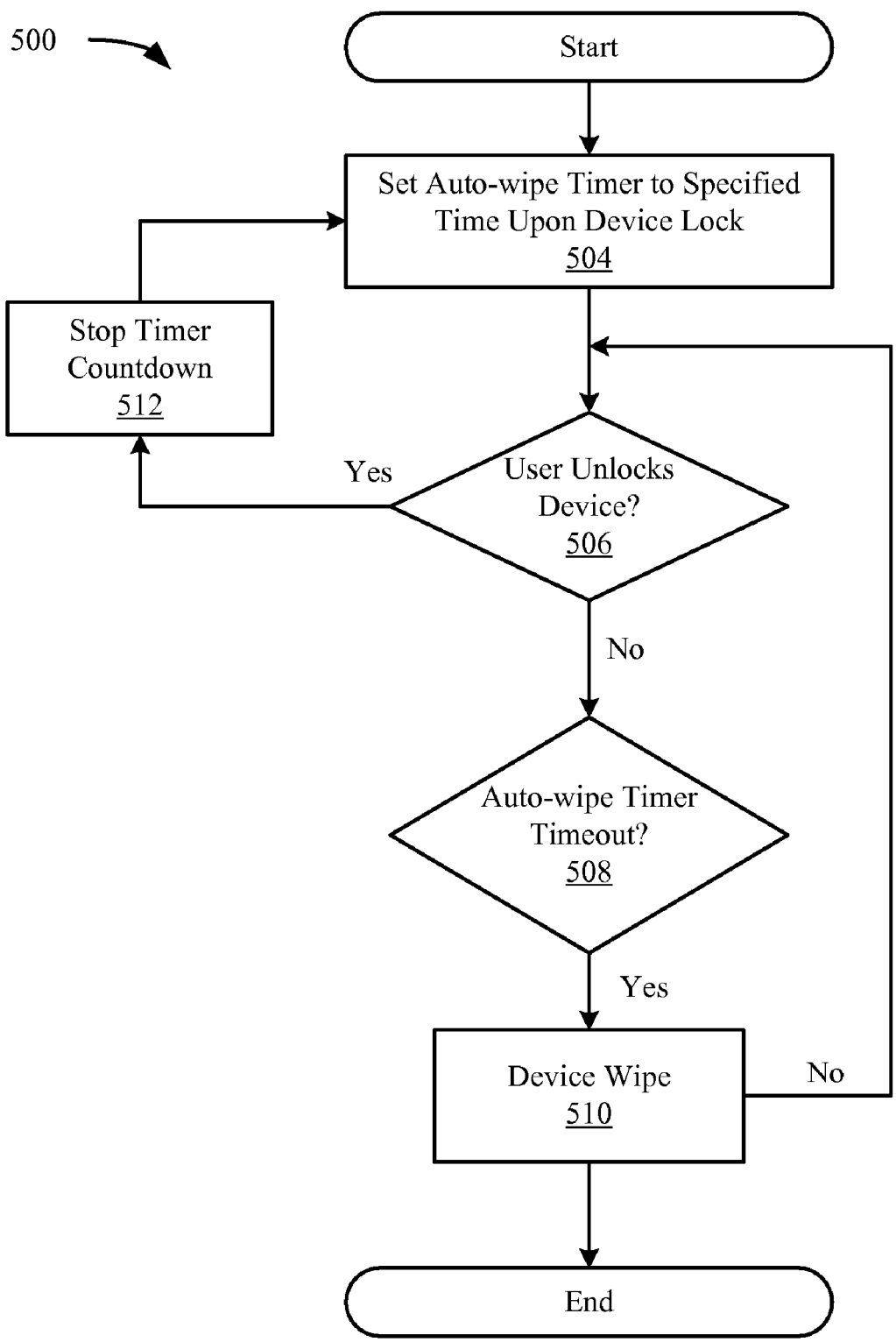
FIG. 5 is a flow diagram showing another example embodiment of a security process that can be applied to the device of FIG. 1.

In the security process 500 of FIG. 5, the data protection policy applied mobile device 10 has been configured to specify that a device wipe automatically be performed if the mobile device 10 remains in a locked state for more than a predetermined time duration. In one embodiment, the data protection policy specifying such an auto-wipe security mode can be set at the enterprise network 70 by an IT administrator and provided to the mobile device 10 through a policy message 72 sent by the mobile device server 66 through the wireless network 50. In a similar manner, the auto-wipe security process 500 can be disabled by an IT administrator at the enterprise network 70.

In the case where the security process 500 is enabled by the data protection policy applied to the mobile device 10, then an auto-wipe countdown timer is set to a specified time (which could be for example be specified in a message previously received from mobile device server 66) as soon as the mobile device 10 is placed into a locked state (step 504). Similar to the countdown timer used in security process 200, the timer used in process 500 is also based on absolute time so that changes to the clock time or calendar date on the mobile device 10 do not affect the countdown timer. Once the countdown timer is running, the mobile device 10 monitors to determine if the user authentication occurs (step 506) prior to the expiry of the auto-wipe countdown timer (step 508). If the user authenticates within the requisite time period (user authentication including entry of a password or shared secret to unlock the mobile device 10), then the countdown timer is stopped (step 512). However, if the countdown timer expires before user authentication occurs, then a device wipe occurs (step 510) to mitigate against unauthorized access to data on the device.

It will be appreciated that the situation could arise where a policy message 72 enabling the auto-wipe process of FIG. 5 is received from the mobile device server 66 while the mobile device 10 is already in a locked state. In such a situation, the security module 56 is configured in an example embodiment to immediately set the countdown timer to a value specified in the received policy message 72 and begin process 500. Similarly, a policy message 72 may be received at the mobile device 10 disabling the auto-wipe process 500 of FIG. 5 while the device is locked and the countdown timer is running. In such a situation, the process 500 is terminated without requiring the user entry of the shared secret.

The sub-process 245 discussed above (auto-on and device wipe at expiry of timeout period) and the sub-process 265 (device-wipe when battery low and auto-wipe timer is running) can be run in combination with security process 500 to further enhance security. Additionally, the security processes 200 and 500 can both be applied simultaneously to a mobile device 10, with different countdown timers being used for each.

As previously noted, in the example security processes 200 and 500 described above, the optional sub-process 265 can be used to ensure that the mobile device 10 is wiped if the device battery is sufficiently discharged at the same time that an auto-wipe countdown timer is running. In at least some example embodiments, the security module 56 can be configured to perform a device wipe any time that the battery charge level falls below a threshold, for example, the threshold at which the device radio (wireless communications subsystem 11) gets automatically turned off, regardless of whether any auto-wipe countdown timer is running or not. Thus referring to FIG. 4, step 270 would be modified so that the only relevant determination to be made is if the battery power is below the threshold, and if so, then a device wipe is automatically performed (step 272). In example embodiments, the modified "wipe device when battery low" process 265 can be enabled and disabled through policy messages 72 received at a mobile device 10.

Figure 6:
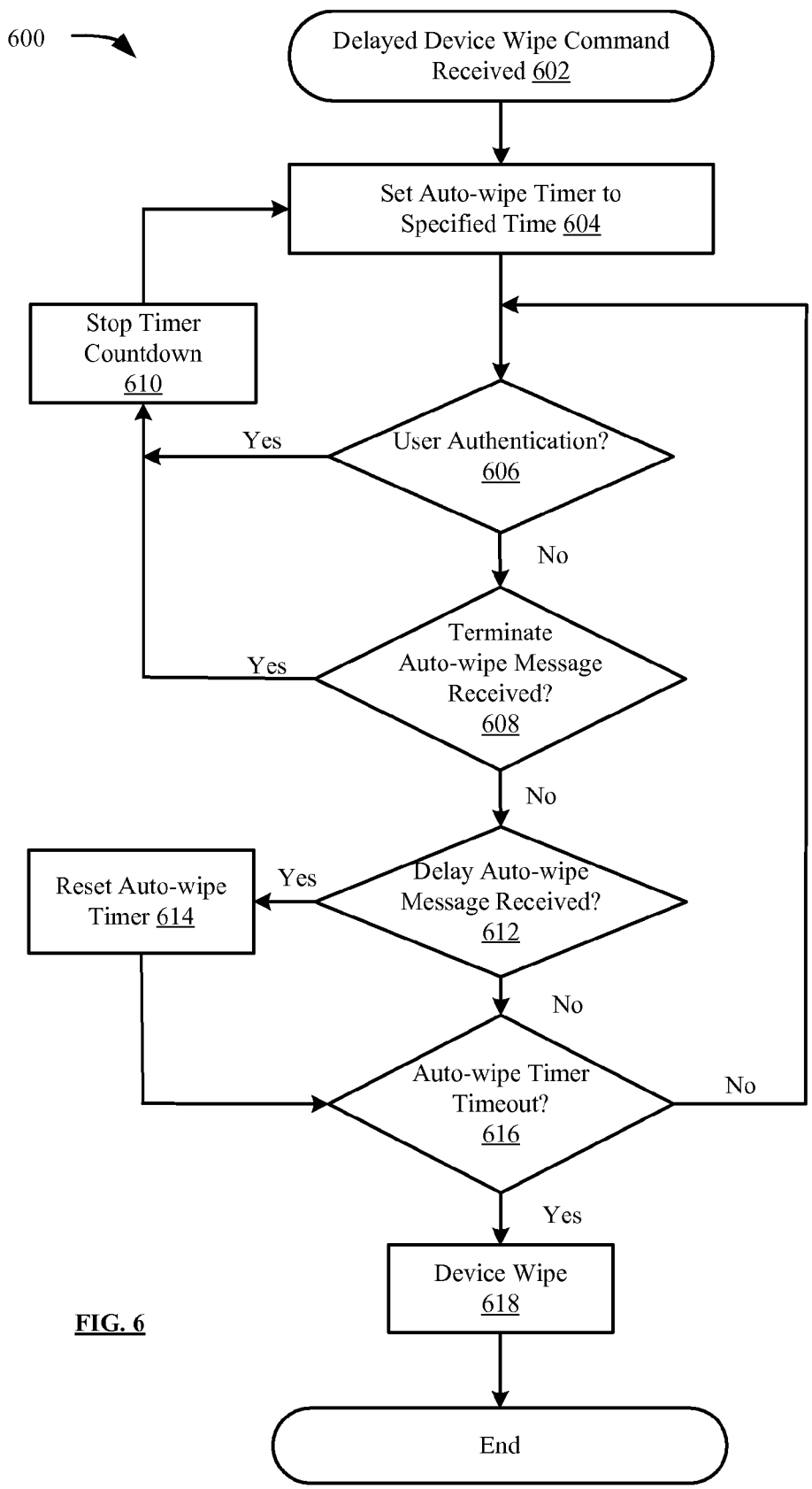
FIG. 6 is a flow diagram showing yet another example embodiment of a security process that can be applied to the device of FIG. 1.

Another example embodiment will now be described. As noted above, one approach to mobile device security is for the IT administrator to cause the mobile device server 66 to send a kill packet or device wipe command to a specific mobile device 10 that the IT administrator has reason to believe may be lost or stolen, perhaps due to a notification from the normal device user that he or she is missing his or her mobile device 10. In such situations, the kill packet causes a device wipe immediately upon being received by the mobile device 10. However, there may be circumstances where a device user has misplaced his or her device, but thinks that there is a chance that they may recover it, and so the device user does not want the device immediately wiped upon advising the IT administrator of the missing device. In this regard, security process 600 of FIG. 6 provides a "delayed-wipe process" in which a delayed data protection initiate command sent (e.g., device wipe command) from the mobile device server 66 includes a specified delay time period (e.g., timer duration), and upon receiving the delayed data protection initiate command, the mobile device 10 starts delayed data protection timer (e.g., auto-wipe countdown timer) configuring the mobile device 10 to perform a security action such as a device wipe if one of the following events does not occur prior the expiry of the timer: (i) the device user does not unlock the device prior to expiry of the timer; (ii) the mobile device 10 does not receive a further message from the mobile device server 66 that either terminates/revokes the delayed data protection timer; or (iii) the mobile device 10 does not receive a further message from the mobile device server 66 that extends the duration of timer.

The illustrated embodiment of FIG. 6 in which the security action to be performed is a device wipe will now be described in more detail. The process 600 commences when an IT administrator causes a delayed device wipe command to be sent from the mobile device server 66 and the command is received at the device (step 602). A delayed device wipe command is similar to a policy message 72 but rather than providing details of an IT data protection policy, the delayed device wipe command instructs the mobile device 10 to start a timer upon receipt of the command and provides information relevant to the timer such as its duration. Typically, the transport and authentication mechanisms for both policy messages 72 and commands are the same, however different transport and authentication mechanism could be used if desired. After receiving the delayed device wipe command, the security module 56 of mobile device 10 then sets an auto-wipe countdown timer to a time specified in the received device wipe command (step 604). Similar to processes 200 and 500, the auto-wipe countdown timer of process 600 measures absolute time so that resetting of the device clock or date has no effect on it. While the auto-wipe countdown timer is running, the security module 56 monitors for occurrence of any one of the following three events: (i) user authentication, which occurs when the user enters a password or shared secret to the mobile device 10 (step 606); (ii) receipt by the mobile device of a terminate auto-wipe command from the mobile device server 66 (step 608) (useful for example if the device user positively determines that they have left the device in a secure location, but they cannot access it to enter the password); and (iii) receipt by the mobile device of a delay auto-wipe command from the mobile device server 66 (step 612) (useful for example if the device user is reasonably certain, but not positive, that the device is in a secure location and wants more time to reach the device). Events (ii) and (iii) give the device user flexibility to contact the IT administrator and arrange for cancellation or variation of the delayed wipe command. In the event that user authentication (step 606) or receipt of a terminate auto-wipe message (step 608) occurs before expiry of the auto-wipe timer, than the security process 600 is terminated (step 610). In the event of receipt by the mobile device of a delay auto-wipe command from the mobile device server 66 (step 612) prior to expiry of the auto-wipe countdown timer than the auto-wipe timer is reset to the new value that is specified in the received command (the auto-wipe timer can be shortened by a similar process, if desired, rather than extended). In the event that auto-wipe timer expires prior to the occurrence of one of the above events, then a device wipe is performed (steps 616 and 618) to erase data 60 and disable the mobile device 10.

The sub-process 245 discussed above (auto-on and device wipe at expiry of timeout period) and the sub-process 265 (device wipe when battery low and auto-wipe timer is running) can be run in combination with security process 600 to further enhance security. Additionally, either or both of the security processes 200 and 500 can be applied in conjunction with process 600 to a mobile device 10, with different countdown timers being used for each.

Figure 7:
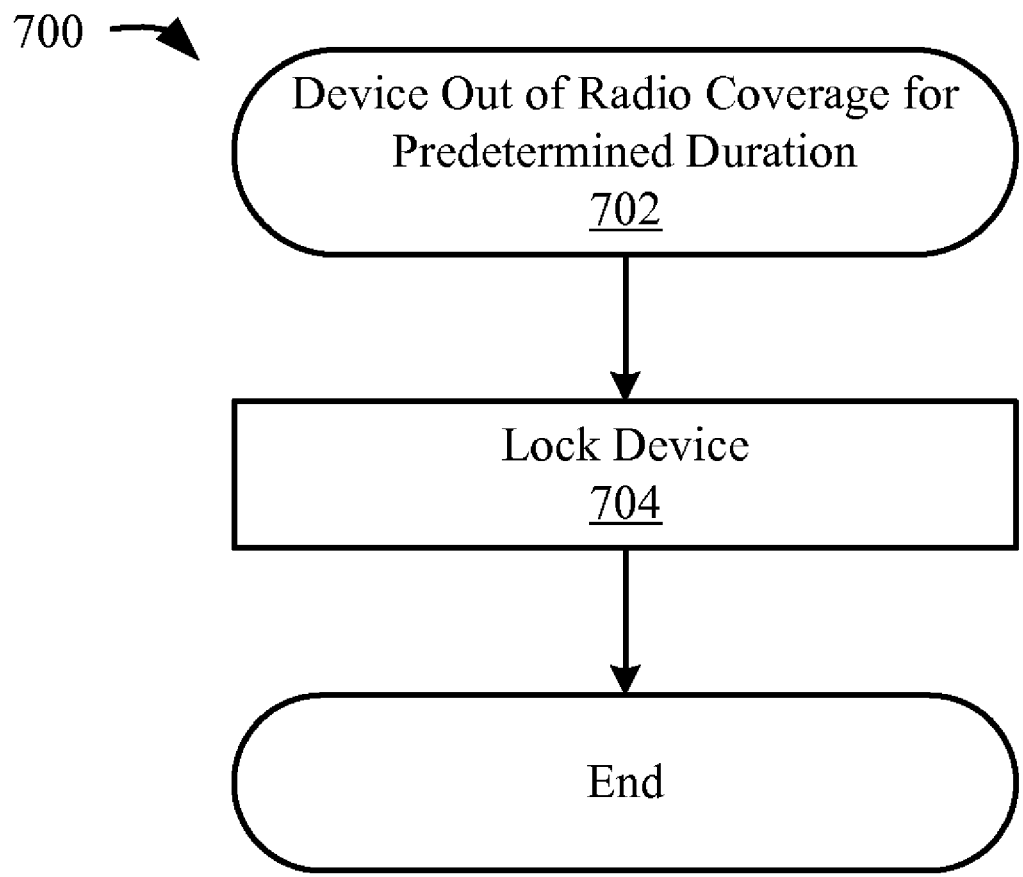
FIG. 7 is a flow diagram showing another security sub-process that can work in conjunction with other security processes described herein.

FIG. 7 illustrates another security sub-process 700 that can be applied to the mobile device either on its own, or in combination with any or all of the processes 200, 500 and 600 and other sub-processes described above. In sub-process 700, the security module 56 forces the mobile device 10 to go into a locked state in the event that the mobile device 10 is out of radio coverage for a predetermined time period, regardless of any current user input activity. As indicated in step 702, the security module 56 is configured to monitor for a lack of radio coverage through communications subsystem 11, and when the lack of coverage time period exceeds a set out-of-coverage time threshold, then the mobile device 10 is forced into a locked state (step 704) regardless of any user interaction with the device at the time. After the device enters the locked state, an authorized user will have the ability to at least temporarily unlock the device upon entry of the correct password or shared secret; however, without the entry of the password or shared secret the device will remain locked.

When sub-process 700 is enabled, even if the user successfully unlocks the device, it will again lock itself if it remains out of radio coverage for the predetermined out-of-coverage threshold. Security process 700 provides some assurances that when the mobile device 10 is out of radio coverage (and thus unable to receive a kill packet or device wipe command) that the device will be in a locked state if it is in unauthorized hands. When combined with security process 500, the sub-process 700 can cause the device lock triggering event for starting the auto-wipe timer of process 500. In some embodiments, the security module 56 may be configured to perform a long term timeout that will lock the device every N minutes regardless of what the user is doing or what the radio coverage for the mobile device 10 is. Sub-process 700 can be used to effectively shorten the long term timeout period by applying a shorter timeout threshold when the device is out of radio coverage. In example embodiments, the "lock device when out-of coverage" process 700 can be enabled and disabled through policy messages 72 received at a mobile device 10.

In accordance with another example embodiment, there is provided a mobile communications device 10, comprising: a processor for controlling the operation of the mobile communications device 10; a user input device 28, 32 connected to the processor 38 for sending user input signals to the processor 38 in response to user inputs; a communications subsystem 11 connected to the processor 38 for exchanging signals with a wireless network 50 and with the processor 38; a security module 56 associated with the processor 38 for monitoring to detect for a lack of communication through the communications subsystem 11, if the duration of the lack of communication through the communications subsystem 11 time period exceeds a predetermined duration, performing a security action comprising erasing or encrypting at least some of the data 60 on the storage element 24, 26. The security module 56 may also initiate a locked state of the mobile communications device 10 if the duration of the lack of communication through the communications subsystem 11 time period exceeds a predetermined duration, and perform monitoring, after the locked state has been initiated, to detect if a password shared by the user and the mobile communications device 10 is entered through the user input device 28, 32, and if entry of the password is detected, terminate the locked state. The security module 56 may be configured to only perform a security action if the duration of the lack of communication through the communications subsystem 11 time period exceeds a predetermined duration and the mobile communications device 10 remains in a locked state. The monitoring to detect for a lack of communication and/or monitoring to detect if a password shared by the user and the mobile communications device 10 is entered through the user input device may be enabled and disabled by respective policy messages 72 received on the mobile communications device 10. A related method and server for sending policy messages 72 to the mobile communications device 10 is also provided.

It will be appreciated to persons skilled in the art that various alterations, modifications and variations to the particular embodiments described herein are possible. For example, although the data protection security action has been described primarily as the erasure or "wiping" of data 60, it will be appreciated that encryption may be used as an alternative to wiping data. In addition, the data 60 which is subject to the data protection security action may be user application data 63 (such as that associated with the application modules 58), service data 61 required to establish and maintain communications with the wireless network 50, service data 61 required to establish and maintain communications with the wireless gateway 62, or combinations thereof The erasure or encryption of data 60 may be performed on some or all of each of the above-described data types, or portions thereof. In addition, in some embodiment some of the data 60 may be erased and some of the data 60 may be encrypted. The decision between the data 60 which is erased and the data 60 which is encrypted may be based on the type of data. In addition, the security module 56 may be configurable by the user to erase or encrypt the data 60 on the storage element 24, 26. In addition, in some embodiments, where data 60 is erased the data protection security action may further comprise overwriting (with meaningless data/bits, such as ones or zeroes) the portion of the storage element 24, 26 where the erased data was data 60 was formerly stored.

While the present application is primarily described as a method, a person of ordinary skill in the art will understand that the present application is also directed to a communications device (such as the mobile communications device described above), for carrying out the disclosed method and including components for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus (i.e., a communications device such as the mobile communications device described above), articles of manufacture, and computer data signals also come within the scope of the present application. In addition, a communications system comprising a mobile data server and a plurality of mobile communication devices connected via a wireless communication network, in which the mobile data server is configured to implement at least some of the security processes herein described, and in which one or more of the mobile communication devices are configured to implement at least some of the security processes herein described, also comes within the scope of the present application.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. The subject matter described herein and in the recited claims intends to cover and embrace all suitable changes in technology.

The invention claimed is:

1. A mobile communications device, comprising: a processor; a communications subsystem connected to the processor operable to exchange signals with a wireless network and with the processor; a storage element connected to the processor and having a plurality of application modules and data stored thereon, the data comprising at least user application data associated with the application modules and service data including data for establishing communications with the wireless network; and a security module operable to detect a locked state of the mobile communications device and initiate a lockout data protection timer for a predetermined duration upon detection of the locked state; and wherein the security module is operable to, after the lockout data protection timer has been initiated, detect if a password shared by the user and the mobile communications device is entered through a user input device within the predetermined duration of the lockout data protection timer; wherein the security module is operable to terminate the lockout data protection timer if entry of the password is detected within the predetermined duration; and wherein the security module is operable to perform a security action comprising erasing or encrypting at least some of the data on the storage element if entry of the password is not detected within the predetermined duration.

2. The mobile communications device of claim 1, wherein the security module is operable to initiate the locked state of the mobile communications device upon detection of a trigger condition.

3. The mobile communications device of claim 1, wherein the security module is operable to terminate the locked state of the mobile communications device if entry of the password is detected within the predetermined duration.

4. The mobile communications device of claim 1, wherein the trigger condition is one of: user input instructing the mobile communications device to initiate the locked state; the occurrence of a periodic interval; user inactivity for a predetermined duration of inactivity; loss of communication with the wireless network; holstering of the mobile communications device if the device is a holsterable device; and closing of the mobile communications device if the device is a flip-style device.

5. The mobile communications device of claim 1, wherein the predetermined duration of the lockout data protection timer is an absolute time duration relative to a time when the locked state is initiated.

6. The mobile communications device of claim 1, wherein the security module is operable to enable or disable, upon receipt of a policy message comprising a respective enable or disable instruction, the operability to detect the locked state of the mobile communications device and to detect entry of the password shared by the user and the mobile communications device to terminate the lockout data protection timer.

7. The mobile communications device of claim 6, wherein the predetermined duration of the lockout data protection timer is provided in the policy message enabling the detection of the locked state.

8. The mobile communications device of claim 6, wherein the security module is operable to automatically initiate the lockout data protection timer if the locked state has already been initiated, upon receiving the policy message enabling the detection of the locked state, the lockout data protection timer being set to a predetermined duration provided in the policy message enabling the detection of the locked state.

9. The mobile communications device of claim 6, wherein the security module is operable to automatically terminate the lockout data protection timer if the locked state has already been initiated, upon receiving a policy message disabling the detection of the locked state.

10. The mobile communications device of claim 1, wherein, in the locked state substantially all of the functionality of the mobile communications device is restricted, user input accepted during the locked state being substantially limited to entry of the password shared by the user and the mobile communications device through the user input device.

11. The mobile communications device of claim 1, wherein the security module is operable to detect a lack of communication through the communications subsystem; and wherein the security module is operable to initiate the locked state of the mobile communications device if the duration of the lack of communication through the communications subsystem exceeds a predetermined duration.

12. The mobile communications device of claim 11, wherein the security module is operable to enable or disable, upon receipt of a policy message comprising a respective enable or disable instruction, the operability to detect the lack of communication and to initiate the locked state of the mobile communications device if the duration of the lack of communication through the communications subsystem exceeds a predetermined duration.

13. The mobile communications device of claim 1, wherein the security action comprises erasing at least some of the data on the storage element and overwriting the portions of the storage element where the erased data was located.

14. The mobile communications device of claim 1, wherein the security action comprises erasing substantially all of the user application data from the storage element.

15. The mobile communications device of claim 1, wherein the security action comprises erasing substantially all of the service data from the storage element.

16. The mobile communications device of claim 1, wherein the security action comprises encrypting at least some of the data on the storage element.

17. The mobile communications device of claim 1, wherein the security action comprises encrypting substantially all of the user application data from the storage element.

18. The mobile communications device of claim 1, wherein the security action comprises encrypting substantially all of the service data from the storage element.

19. The mobile communications device of claim 1, wherein the service data further includes data required to establish communications through a wireless gateway connected to the wireless network.

20. The mobile communications device of claim 1, wherein the security module is configurable by the user to erase or encrypt the data on the storage element, or selectively erase and encrypt portions of the data on the storage element.

21. A method for providing security on a mobile communications device, the mobile communications device being configured to communicate with a wireless communications network and including a storage element having data stored thereon, the method comprising the acts of: monitoring to detect for the locked state of the mobile communications device and initiating a lockout data protection timer for a predetermined duration upon detection of the locked state; and monitoring, after the lockout data protection timer has been initiated, to detect if a password shared by the user and the mobile communications device is entered through the user input device within the predetermined duration of the lockout data protection timer; if entry of the password is detected within the predetermined duration, terminating the lockout data protection timer; and if entry of the password is not detected within the predetermined duration, performing a security action comprising erasing or encrypting at least some of the data on the storage element.

22. The method of claim 21, further comprising: monitoring for a trigger condition for initiating the locked state of the mobile communications device and initiating the locked state of the mobile communications device upon detection of the trigger condition.

23. The method of claim 21, further comprising: if entry of the password is detected within the predetermined duration, terminating the locked state of the mobile communications device.

24. The method of claim 22, wherein the trigger condition is one of: user input instructing the mobile communications device to initiate the locked state; the occurrence of a periodic interval; user inactivity for a predetermined duration of inactivity; loss of communication with the wireless network; holstering of the mobile communications device if the device is a holsterable device; and closing of the mobile communications device if the device is a flip-style device.

25. The method of claim 21, wherein the predetermined duration of the lockout data protection timer is an absolute time duration relative to a time when the locked state is initiated.

26. The method of claim 21, wherein the monitoring to detect for the locked state of the mobile communications device and monitoring to detect for entry of the password shared by the user and the mobile communications device is entered is enabled and disabled by respective policy messages received on the mobile communications device.

27. The method of claim 26, wherein the predetermined duration of the lockout data protection timer is provided in the enabling policy message.

28. The method of claim 26, further comprising: if the locked state has already been initiated, automatically initiating the lockout data protection timer upon receiving a policy message enabling the monitoring for the locked state, the lockout data protection timer being set to a predetermined duration provided in the policy message enabling the monitoring for the locked state.

29. The method of claim 26, further comprising: if the locked state has already been initiated, automatically terminating the lockout data protection timer upon receiving a policy message disabling the monitoring for the locked state.

30. The method of claim 21, wherein, in the locked state substantially all of the functionality of the mobile communications device is restricted, user input accepted during the locked state being substantially limited to entry of the password shared by the user and the mobile communications device through the user input device.

31. The method of claim 21, wherein the act of monitoring to detect for the locked state comprises: monitoring to detect for a lack of communication through the communications subsystem, if the duration of the lack of communication through the communications subsystem exceeds a predetermined duration, initiating the locked state of the mobile communications device.

32. The method of claim 31, wherein the monitoring to detect for the lack of communication and initiate of the locked state of the mobile communications device if the duration of the lack of communication through the communications subsystem exceeds a predetermined duration is enabled or disabled upon receipt of a policy message comprising a respective enable or disable instruction.

33. The method of claim 21, wherein the security action comprises erasing at least some of the data on the storage element and overwriting the portions of the storage element where the erased data was located.

34. The method of claim 21, wherein the security action comprises erasing substantially all of the user application data from the storage element.

35. The method of claim 21, wherein the security action comprises erasing substantially all of the service data from the storage element.

36. The method of claim 21, wherein the security action comprises encrypting at least some of the data on the storage element.

37. The method of claim 21, wherein the security action comprises encrypting substantially all of the user application data from the storage element.

38. The method of claim 21, wherein the security action comprises encrypting substantially all of the service data from the storage element.

39. The method of claim 21, wherein the service data further includes data required to establish communications through a wireless gateway connected to the wireless network.

40. The method of claim 21, wherein the security action is configurable by the user to erase or encrypt the data on the storage element, or selectively erase and encrypt portions of the data on the storage element.

41. A computer program product comprising a non-transitory tangible machine-readable medium embodying instructions executable on a mobile communications device for providing security on the mobile communications device, the machine-readable instructions comprising: code for monitoring to detect for the locked state of the mobile communications device and initiating a lockout data protection timer for a predetermined duration upon detection of the locked state; code for monitoring, after the lockout data protection timer has been initiated, to detect if a password shared by the user and the mobile communications device is entered through the user input device within the predetermined duration of the lockout data protection timer; code for terminating the lockout data protection timer if entry of the password is detected within the predetermined duration; and code for performing a security action comprising erasing or encrypting at least some of the data on the storage element if entry of the password is not detected within the predetermined duration.

* * * * *